2 Sheets—Sheet 1.

C. F. BUTTERFIELD.
GRAIN-SEPARATOR.

No. 170,936. Patented Dec. 14, 1875.

WITNESSES:
P. C. Dietrich
F. H. Duffy

INVENTOR
Chas. F. Butterfield
per C. H. Watson & Co
ATTORNEYS.

N. PETERS, PHOTO-LITHOGRAPHER, WASHINGTON, D. C.

C. F. BUTTERFIELD.
GRAIN-SEPARATOR.
No. 170,936. Patented Dec. 14, 1875.
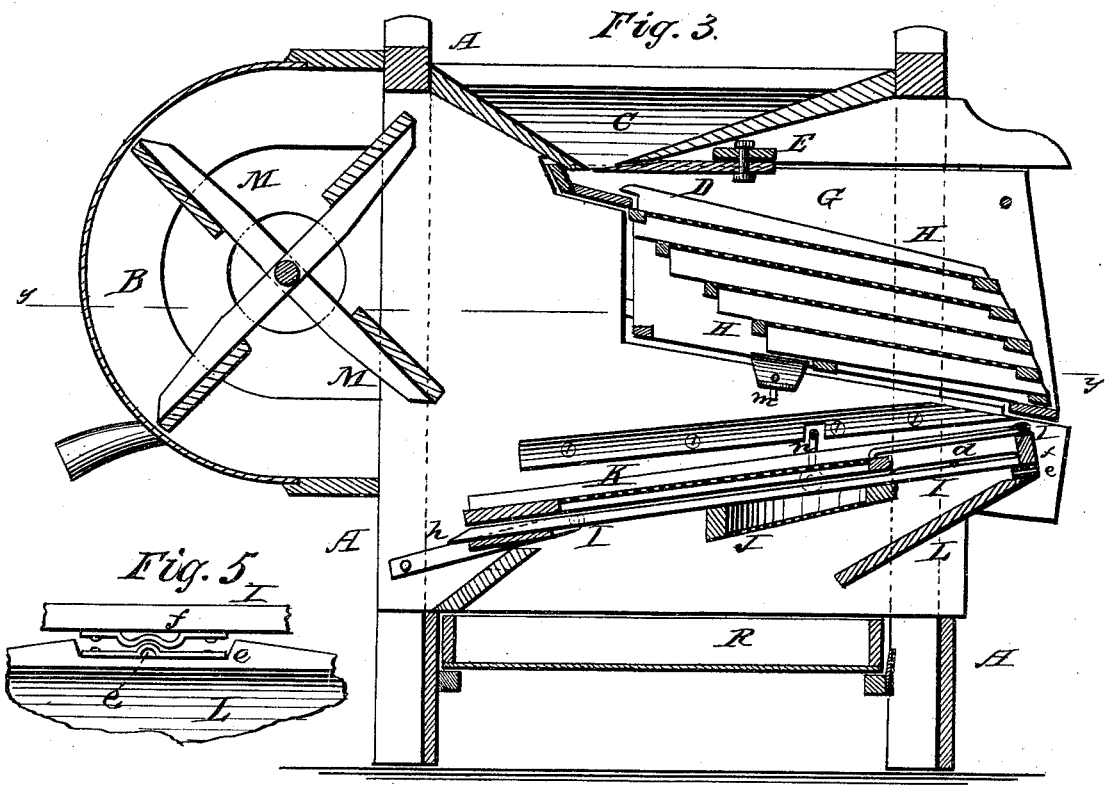
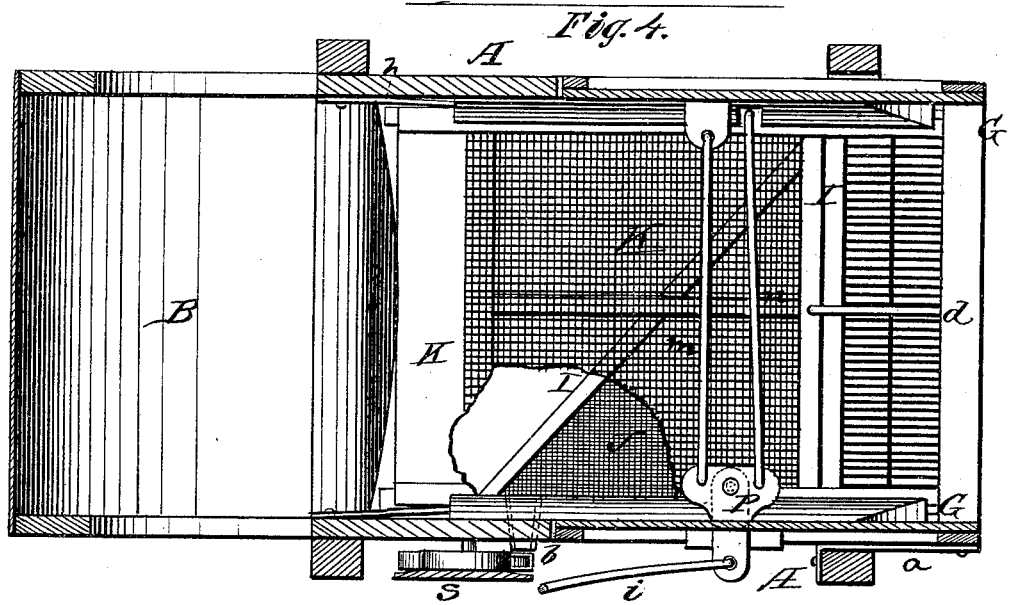
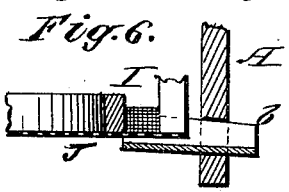
WITNESSES:
P. C. Dieterich
F. H. Duffy
INVENTOR:
Chas. F. Butterfield
per
C. H. Watson & Co.
ATTORNEYS

UNITED STATES PATENT OFFICE.

CHARLES F. BUTTERFIELD, OF GARDEN CITY, MINNESOTA.

IMPROVEMENT IN GRAIN-SEPARATORS.

Specification forming part of Letters Patent No. 170,936, dated December 14, 1875; application filed October 5, 1875.

*To all whom it may concern:*

Be it known that I, CHARLES F. BUTTERFIELD, of Garden City, in the county of Blue Earth and State of Minnesota, have invented certain new and useful Improvements in Fanning-Mills; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a fanning-mill, as will be hereinafter more fully set forth.

Figure 1:
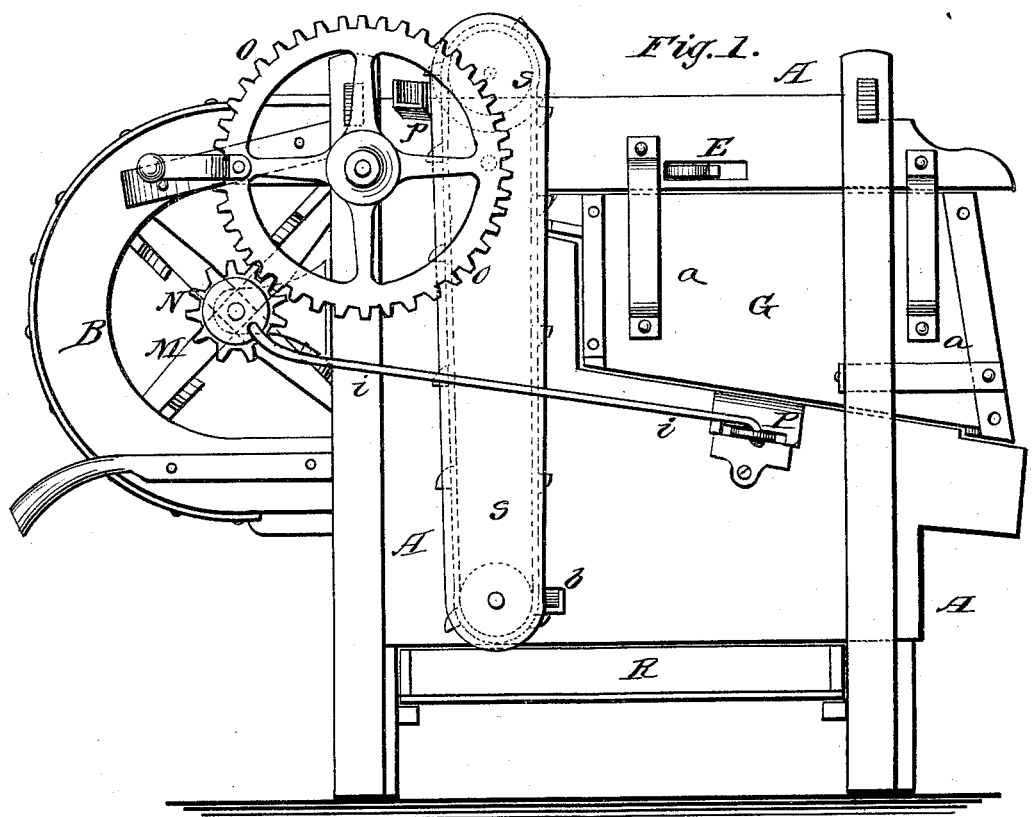
Figure 2:
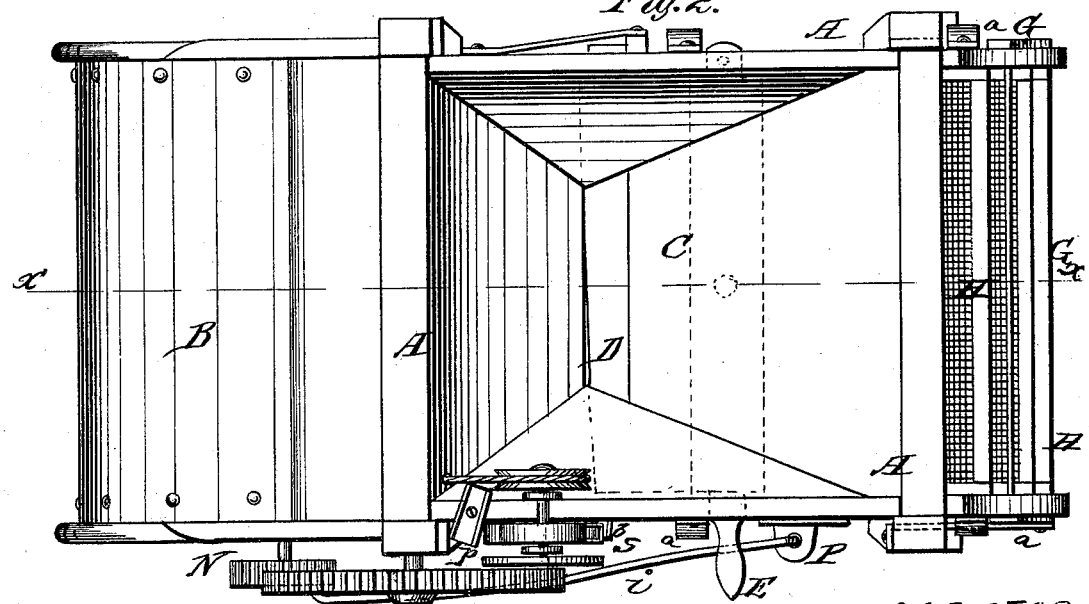

In the annexed drawings, Figure 1 is a side elevation. Fig. 2 is a plan view. Fig. 3 is a central longitudinal section on line *x x* of Fig. 1. Fig. 4 is a cross-section on line *y y*, Fig. 3; and Figs 5 and 6 are details of my invention.

A represents the frame of my fanning-mill constructed in any of the known and usual ways, and formed with the fan-case B at one end. In the top of the frame A is the ordinary hopper C, which is provided with a slide or gate, D, moving upon suitable guides in the sides of the frame, and operated by means of a pivoted lever, E, that projects through a slot to one side of the frame. By this arrangement the slide or gate D is easily operated to regulate the flow of grain from the hopper to the sieves underneath. G is the upper shoe, suspended in the frame A by means of straps *a a*, and containing the gang of sieves H, as shown. Below this shoe in the frame is a frame, I, containing a triangular screen, J, with a conductor, *b*, along its inclined side. On top of the frame I, and connected thereto by a rod, *d*, is another screen, K. Under the upper end of the frame I is an inclined conducting-board, L, the upper edge of which is made inclined from the center downward toward both sides, and in the center is fastened a corrugated plate, *e*. On the under side of the frame I, at the point where it comes in contact with the plate *e*, is fastened another corrugated plate, *f*. The lower end of the frame I is supported upon the edge of a strip, *h*, which is made inclined in the same manner as described for the board L. M represents the fan in the fan-case B. The shaft of this fan projects a suitable distance beyond one side of the frame, and has a pinion, N, fastened on it, which pinion is revolved by means of the cogged crank wheel O mounted on a stud projecting from the frame. In the pinion N is pivoted the pitman *i*, which connects with one arm of a T-shaped lever, P, pivoted in the frame A. The other two arms of this lever are, by rods *m* and *n*, connected respectively with the shoe G and frame I.

It will be seen that, by this arrangement, the shoe G with its sieves H obtains the usual shaking side motion, while the screens J K have a threefold motion. They are moved from side to side by the rod *n*; they rock or vibrate on account of the inclination of the edges upon which the frame I is supported; and they have a shaking motion caused by the corrugated plate *f* passing back and forth over the corrugated plate *e*.

The grain, after being cleaned, passes into a drawer, R, underneath, while the tailings are carried by the conductor *b* to an elevator, S, on the side of the machine, and by said elevator carried upward and emptied through a spout, *p*, into the hopper C, so as to be run through the machine again.

Having thus fully described my invention, what I claim as new, and desire to secure by Letters Patent, is—

1. The combination, with the frame I and its screens J K, of the support L, having its edges inclined as described, and the corrugated plates *e f*, substantially as and for the purposes herein set forth.

2. The frame I, and its screens J K and supports L, in combination with the conductor *b*, elevator S, spout *p*, and hopper C, all as and for the purpose herein specified.

In testimony that I claim the foregoing as my own I affix my signature in presence of two witnesses.

CHARLES F. BUTTERFIELD.

Witnesses:
LORIN CRAY,
S. F. STODDARD.